Dec. 1, 1925.　　　　　E. PEMBERTON　　　　　1,563,647
INCUBATOR
Filed Jan. 10, 1921　　　　2 Sheets-Sheet 1

INVENTOR
Elmer Pemberton
By R. S. Berry
Attorney

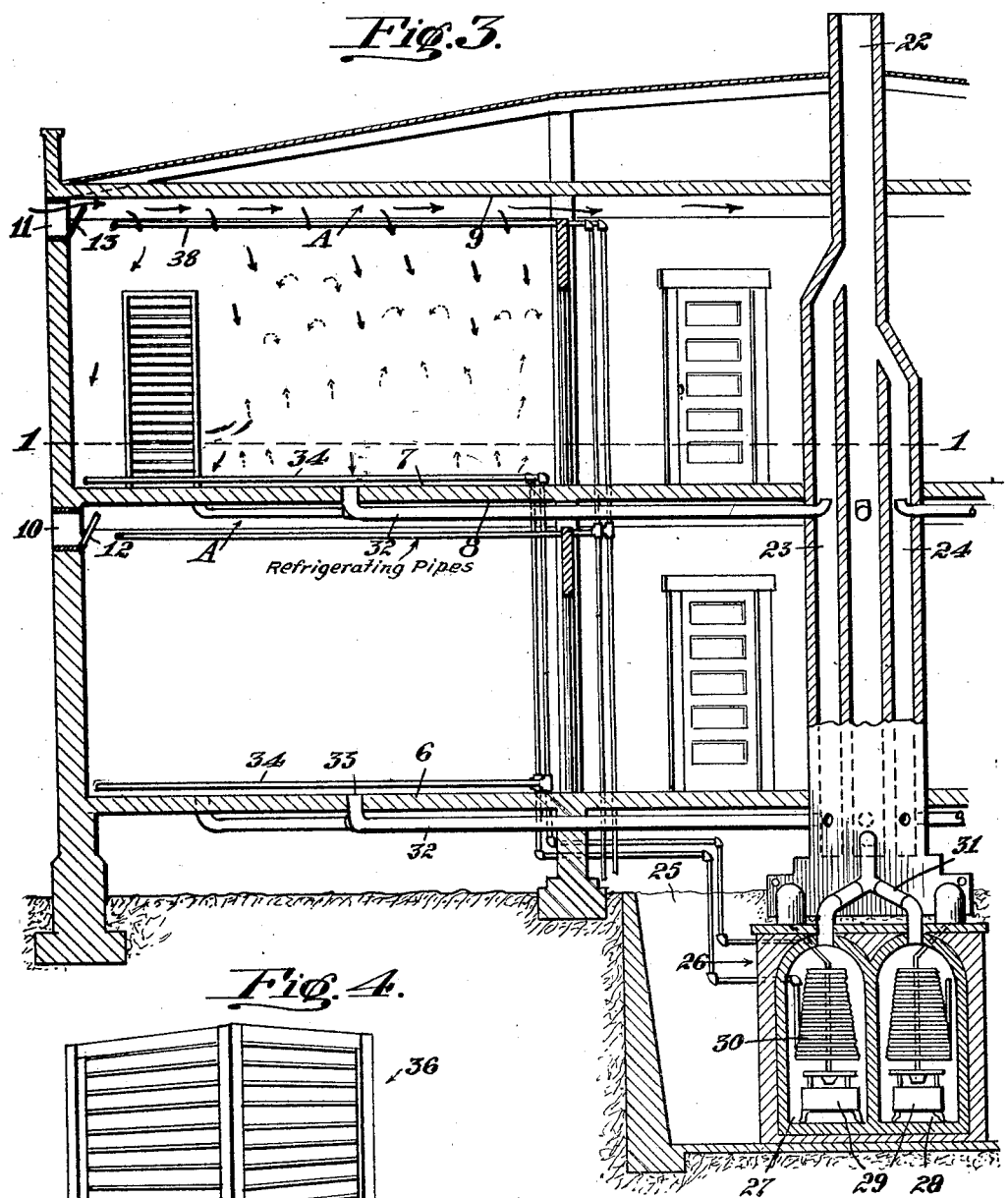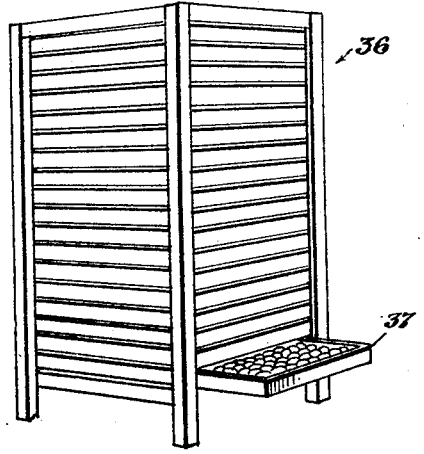

Patented Dec. 1, 1925.

1,563,647

UNITED STATES PATENT OFFICE.

ELMER PEMBERTON, OF HYDE PARK, CALIFORNIA.

INCUBATOR.

Application filed January 10, 1921. Serial No. 436,225.

*To all whom it may concern:*

Be it known that I, ELMER PEMBERTON, a citizen of the United States, residing at Hyde Park, in the county of Los Angeles and State of California, have invented new and useful Improvements in Incubators, of which the following is a specification.

This invention relates to a structure for hatching eggs, and the object thereof is to provide an incubator which is so constructed and arranged and adapted to be so operated that the eggs to be hatched may be placed therein at frequent intervals so as to obtain, if desired, a daily hatch and by means of which a large number of eggs may be incubated at one time and subjected to such temperatures as to insure incubation.

Another object is to provide an incubator structure embodying a series of incubating compartments, each of which may be operated and controlled independent of the other.

Another object is to provide an incubator structure which is so designed and arranged that its several compartments may be employed for various purposes, such, for example, as hatching eggs of the domestic fowls, brooding the chicks, providing a housing for the poultry in the course of its growth and development, and also providing a cold storage for fowls prepared for market.

Another object is to provide an efficient means for creating the proper degrees of temperature and conditions of humidity in the various compartments of the incubator structure according to the use to which a particular compartment is to be put, or to meet varying conditions therein.

A further object is to provide a construction in an incubator and housing of the above character for obtaining proper ventilation and supplying a desired quantity of fresh air to each compartment and maintaining a flow of atmosphere through the compartments whereby the fresh air will be supplied directly from out of doors and without the use of fans, blowers, and the like.

Other objects will appear hereafter.

The invention is illustrated in the accompanying drawings, in which:

Figure 3 is a view in enlarged vertical section as seen on the line 3—3 of Figure 1.

Figure 4 is a perspective view of an egg carrier for containing the eggs during their incubation.

Figure 1:
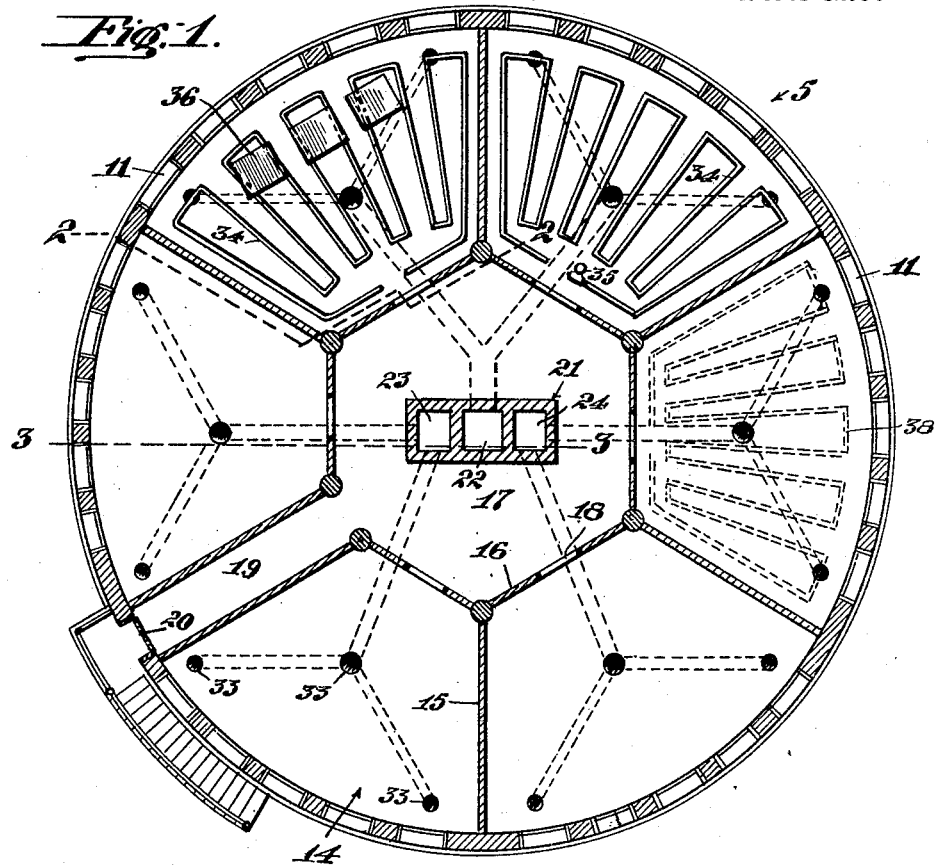
Figure 1 is a horizontal section and plan view of the incubator and housing as seen on the line 1—1 of Figure 3.

More specifically, 5 indicates the housing, which comprises a building structure which may be of any suitable size according to any desired capacity, and which is preferably constructed of circular form to present an arcuate wall in all horizontal directions, so that currents of air, exteriorly of the building, coming from any direction against the sides thereof, will strike corresponding surfaces and insure a supply of fresh air to the interior of the building, as will later appear, in a manner which could not be as readily effected were the structure built with angular walls. However, in some instances the structure may be built of polygonal form. This building may be erected of any suitable height, being here shown as constructed with two superimposed chambers, or stories, having floors 6 and 7 and ceilings 8 and 9. In carrying out my invention I provide a series of apertures 10 and 11 in the outside wall of the building, located close to the ceilings 8 and 9, and which are fitted with hinged closures 12 and 13, by which the apertures may be closed or opened to any desired extent. These apertures provide a means for admitting fresh moisture-laden air to the interior of the building from the outside atmosphere and being arranged comparatively close together throughout the circumference of the building, provide means for forming a zone of relatively cool, moist air across the upper portion of the chambers.

The interior of each chamber is divided into a series of rooms or compartments 14 by radial partitions 15, which extend from the circular wall of the structure to a point spaced from the center of the building and are connected by cross-partitions 16, which enclose the chambers 14 and also form a central compartment or room 17, from which access may be had through doorways 18 in each of the walls 16 to the several compartments 14. The partitions 15 and 16 extend to a point and terminate adjacent to the ceilings 8 and 9, forming spaces A, which connect the adjacent compartments and provide a means whereby the moist air entering the structure from the exterior thereof to the apertures 10 and 11 may be distributed throughout the areas of the ceilings and meet with no material vertical obstructions, whereby a current of cool moist air entering one side of the building may flow across the building over the compartments and a portion thereof may be discharged through the apertures 10 and 11 on the opposite side of the building, if so desired. A uniform distribution of the relatively cool moist air to the upper portion of each compartment is thus obtained. A runway or hall 19 leads from central chamber 17 to the exterior of the building to a doorway 20.

Erected centrally of the building is a chimney 21 formed with a plurality of flues, here shown as comprising a central smoke flue 22, and vent flues 23 and 24 arranged on opposite sides of the smoke flue. The flues extend from a point beneath the floor 6 of the lower chamber, and the smoke flue extends upwardly through the roof of the building, while the vent flues lead into the smoke flue at different levels and at points a considerable distance below the top or outlet of the smoke flue.

Arranged in a basement 25 is a duplex heater 26 embodying a pair of fire boxes 27 and 28, in which are arranged suitable heating elements 29 and steam coils 30; smoke conduits 31 leading from the upper end of each combustion chamber to the lower end of the smoke flue 22, through which heat generated in the combustion chambers passes and in rising to the smoke flue acts to induce an upward draught through the vent flues 23 and 24. Leading from each of the compartments 14 is a series of air conduits 32, which connect with suitable floor openings 33 in the compartments and lead to the chimney; certain of the conduits leading to the smoke flue 22 and others connecting with the vent flues 23 and 24, such, for example, as shown in Figure 1, the conduits, however, may, if desired, be connected only to the vent flue, and any suitable arrangement of the air conduits may be provided to effect a communication between the lower portions of each of the compartments 14, or any number of these compartments, to the chimney flues, so that air may be discharged from the lower portions of the compartments by the suction induced in the flues, or the natural draught created by external air pressures and variations in air pressures and temperatures throughout the structure.

Arranged adjacent to the floors of each of the compartments, or any number thereof, are radiating pipes 34, which may be of any suitable construction and arrangement, and are connected to the steam coils 30 in the manner common to steam heating systems, whereby heat may be generated in the lower portion of each compartment.

Arranged in any one or more of the compartments is a thermostat 35 indicated in diagram in Figure 1, which is adapted to control the temperature of the compartment either by regulating the flow of steam through the radiating pipes 34 or by controlling the generation of the heat in the heating elements, in any well known manner common to heating systems and not necessary to be here shown in detail.

Where a compartment is to be utilized in the incubation of eggs, one or more egg containers 36, such as shown in Figure 4, is arranged in the compartment; the egg container being here shown as comprising a rack supporting a series of superimposed trays 37 adapted to receive the eggs to be hatched. Each tray 37 is designed of such size as to contain approximately a crate of eggs, and as each rack may contain a number of trays and a series of racks are arranged in a compartment, a large number of eggs may be incubated in a single compartment at one time, and as the eggs in certain of the trays are hatched, they may be replaced by fresh eggs, so that if desired a daily or other periodical hatch may be obtained, thus providing an incubator which may be continuously operated.

Figure 2:
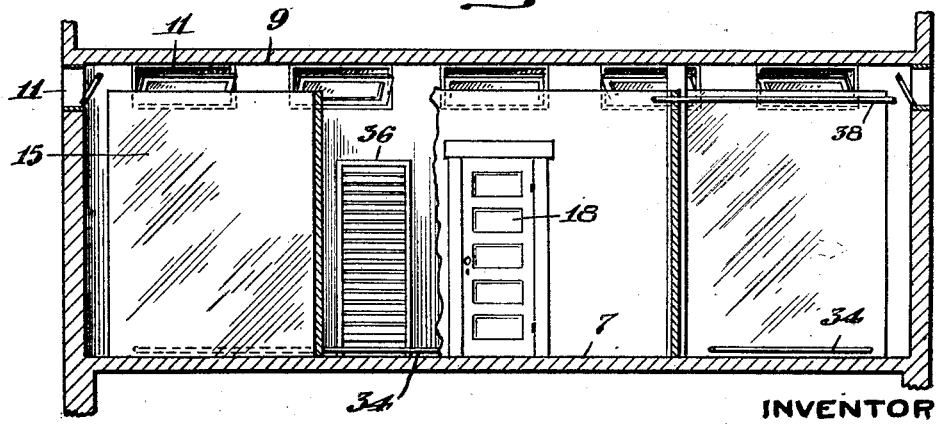
Figure 2 is a view in enlarged vertical section, as seen on the line 2—2 of Figure 1.

As it is necessary to effect a chill of the eggs at intervals in order to insure their hatching, means are provided for reducing the temperature of the compartment containing the eggs requiring such chill, which means is here shown as comprising a series of refrigerating pipes 38 located in the upper portion of the compartment, preferably immediately below the air space A, as shown in Figure 2, which pipes connect with any suitable refrigerating apparatus and may be controlled in any desired manner, and which refrigerating pipes may also be employed to maintain any one or more of the compartments at a low temperature, as where the compartment would be utilized as a storage for fowls prepared for market.

In the operation of the invention, to effect heating of the compartments and to cause a flow of fresh moist air therethrough, one of the heating elements is set in operation both to create an updraught through the smoke flue 22 and to generate steam in the steam coils 30 and the radiator pipes 34. The updraught in the smoke flue acts to induce a suction in the vent flues 23 and 24 and the air conduits 32, thereby creating a downward tendency of the air in the compartments and so that air will be drawn from the lower portion of the compartment, which will be displaced by the supply of fresh moist air admitted through the apertures 10 and 11. The heat rising from the radiator pipes 34 warms the air in the lower portion of the compartment, causes an upward flow of a body of warm air, which, however, on meeting the cooler air zone adjacent the ceiling is cooled and thereafter will have a downward tendency until caused to rise again by reheating or until it is drawn off through the vent flue.

It has been found in practice that the cool layer of air in the upper portion of this compartment exerts a downward pressure on the body of warm air therebeneath, and by reason of its moisture content serves to humidify the warmer air content of the compartment, thereby supplying the moisture necesary to incubation or other uses to which the compartment might be put. Furthermore, the live moisture content of the air in the compartment affords an increase in the heat conductive property of the air so as to effect a thorough distribution of the heat throughout the zone surrounding the egg containers and insures against material variations in temperature. By thus arranging the source of heat below the zone occupied by the eggs from whence convective heat may rise, and by creating a downward flow of moisture laden air, from above the zone occupied by the eggs the heating element may be arranged below the level of the eggs without danger of overheating the eggs, and by thus heating the moist air by convection its moisture content is not dried out thereby affording the desired diffusion of heat and humidity or moisture in the zone occupied by the eggs. It is pointed out that by directing cool moisture laden air against counter-currents of warm air, the water vapor content of the air will be caused to collect and to moisten surfaces in the zone where the mixture occurs, and therefore by employing this principle as herein set forth the eggs will be maintained more moist than where subjected to dry heat as commonly employed in incubators now generally in use.

When it is desired to employ a compartment as a brooder, the temperature of the compartment will be reduced by regulating the flow of steam through the steam pipes, or any other desired manner. In housing the chicks in a compartment, a structure quite similar to that employed as a container for the eggs is used so as to enable housing of a large number of chicks in a small space. The compartment in the lower chamber may be employed for housing poultry during its development and poultry runs may be arranged exteriorly of the building with which the lower compartments communicate.

When it is desired to cool a compartment and to obtain a refrigerating effect, a suitable refrigerant is passed through the refrigerating pipes 38, so as to thoroughly chill the air that is drawn downwardly from the upper portion of the compartment by the suction induced in the vent flues. It is desirable in this operation to maintain heat in the radiating pipes so that the air drawn into the conduit will be warmed to facilitate its upward flow through the vent flue, and prevent excessive chilling of the air in the flues.

While I have shown and described a specific embodiment of my invention, I do not limit myself to the exact details of construction and arrangement shown, but may employ such changes and modifications as come within the scope of the appended claims.

I claim:

1. In an incubator, a compartment having a top wall, a bottom wall, and side walls; said side walls having openings throughout adjacent to the top wall to permit the flow of air across the upper portion of the compartment from the exterior thereof, a heating element in the lower portion of said compartment, and means for creating a downward tendency of the air in said compartment.

2. In an incubator, a compartment having a top wall, a bottom wall, and side walls; said side walls having openings throughout adjacent to the top wall to permit the flow of air across the upper portion of the compartment from the exterior thereof, a heating element in the lower portion of said compartment, and means for creating a downward tendency of the air in said compartment, and means for creating a chill in said compartment.

ELMER PEMBERTON.